United States Patent
Singh et al.

(10) Patent No.: US 10,135,715 B2
(45) Date of Patent: Nov. 20, 2018

(54) BUFFER FLUSH OPTIMIZATION IN ETHERNET RING PROTECTION NETWORKS

(71) Applicant: FUJITSU LIMITED, Kawasaki-shi Kanagawa (JP)

(72) Inventors: Rajnath Singh, Murphy, TX (US); Kevin Corley, McKinney, TX (US); Chenjiang Hu, Plano, TX (US); Daniel Cao, Allen, TX (US)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 15/247,525

(22) Filed: Aug. 25, 2016

(65) Prior Publication Data
US 2018/0062974 A1    Mar. 1, 2018

(51) Int. Cl.
| H04L 12/437 | (2006.01) |
| H04L 12/703 | (2013.01) |
| H04L 12/705 | (2013.01) |
| H04L 12/721 | (2013.01) |
| H04L 12/741 | (2013.01) |
| H04L 12/751 | (2013.01) |

(52) U.S. Cl.
CPC .............. *H04L 45/02* (2013.01); *H04L 45/28* (2013.01); *H04L 12/437* (2013.01); *H04L 45/18* (2013.01); *H04L 45/66* (2013.01)

(58) Field of Classification Search
CPC ... H04L 12/42; H04L 12/437; H04L 12/4637; H04L 41/06; H04L 41/0654; H04L 43/0811; H04L 45/02; H04L 45/22; H04L 45/28; H04L 49/00; H04L 49/40; H04L 2012/421; H04L 2012/6437
See application file for complete search history.

(56) References Cited

U.S. PATENT DOCUMENTS

| 8,107,383 | B2 * | 1/2012 | Kashyap | H04L 12/437 370/245 |
| 8,699,380 | B2 * | 4/2014 | Kapitany | H04L 12/437 370/254 |
| 8,804,748 | B2 * | 8/2014 | Jia | H04L 12/42 370/254 |
| 9,042,216 | B2 * | 5/2015 | Rose | H04L 12/437 370/222 |
| 9,088,438 | B2 * | 7/2015 | Gohite | H04L 12/4641 |
| 9,264,254 | B2 * | 2/2016 | Holness | H04L 49/00 |
| 9,276,767 | B2 * | 3/2016 | Bos | H04L 12/437 |
| 9,800,432 | B2 * | 10/2017 | Gohite | H04L 12/4641 |

(Continued)

OTHER PUBLICATIONS

"Ethernet Ring Protection Overview," G.8032, liaison-itut-g8032-overview-0308.pdf, 23 pgs. Mar. 2008.
(Continued)

*Primary Examiner* — Eric Nowlin
(74) *Attorney, Agent, or Firm* — Baker Botts L.L.P.

(57) ABSTRACT

A method and system for buffer flush optimization in Ethernet ring protection (ERP) networks includes generating ERP control messages to include a sub-ring identifier (SUB RING ID) and a topology change notification sequence number (TCN#). When the ERP control messages are received with the sub-ring SUB RING ID and the TCN#, the recipient is enabled to disambiguate multiple redundant ERP control messages. Additionally, a do not flush attribute bit is set for subsequently sent ERP control messages.

12 Claims, 6 Drawing Sheets

(56) References Cited

U.S. PATENT DOCUMENTS

| | | | |
|---|---|---|---|
| 9,819,536 B2* | 11/2017 | Tsubota | H04B 3/36 |
| 9,929,878 B1* | 3/2018 | Sudharshan | H04L 12/4641 |
| 2009/0252030 A1* | 10/2009 | Kashyap | H04L 12/437 |
| | | | 370/216 |
| 2009/0316571 A1* | 12/2009 | Rose | H04L 12/437 |
| | | | 370/218 |
| 2010/0226245 A1* | 9/2010 | Ryoo | H04L 12/437 |
| | | | 370/225 |
| 2011/0292833 A1* | 12/2011 | Kapitany | H04L 12/437 |
| | | | 370/254 |
| 2013/0064071 A1* | 3/2013 | Bos | H04L 12/437 |
| | | | 370/223 |
| 2013/0177021 A1* | 7/2013 | Kitayama | H04L 12/4637 |
| | | | 370/392 |
| 2013/0258840 A1* | 10/2013 | Holness | H04L 49/00 |
| | | | 370/222 |
| 2014/0211641 A1* | 7/2014 | Gohite | H04L 12/4641 |
| | | | 370/252 |
| 2014/0328160 A1* | 11/2014 | Zhou | H04L 12/437 |
| | | | 370/218 |
| 2015/0288535 A1* | 10/2015 | Gohite | H04L 12/4641 |
| | | | 370/242 |
| 2016/0072640 A1* | 3/2016 | Yang | H04L 12/437 |
| | | | 370/218 |
| 2016/0142225 A1* | 5/2016 | Taniguchi | H04L 12/437 |
| | | | 370/223 |
| 2017/0155575 A1* | 6/2017 | Bertucci | H04L 12/437 |
| 2018/0062974 A1* | 3/2018 | Singh | H04L 45/02 |
| 2018/0076975 A1* | 3/2018 | Sudharshan | H04L 12/4641 |

OTHER PUBLICATIONS

"Ethernet Ring Protection Overview," G.8032 v2, liaison-parsons-itut-g8032-overview-1109.pdf, 15 pgs. Nov. 2009.

Krishnan, Saran, "Basic Constructs of Ethernet Ring Protection Switching (Erps)," basic-constructs-of-ethernet-ring-protection-switching.pdf, 5 pgs. 5/30/13.

* cited by examiner

300 ⤳ G.8032 RING PHYSICAL TOPOLOGY

G.8032 RING LOGICAL TOPOLOGY: IDLE STATE ⤳ 301

302 ⤳ G.8032 RING LOGICAL TOPOLOGY: PROTECTING STATE

BUFFER FLUSH OPTIMIZATION IN ETHERNET RING PROTECTION NETWORKS

BACKGROUND

Field of the Disclosure

The present disclosure relates to communications systems and more specifically to buffer flush optimization in Ethernet ring protection networks.

Description of the Related Art

A communication network may include network elements that route packets through the network. The communication network may be an Ethernet network.

In the G.8032 recommendation promulgated by the International Telecommunication Union Telecommunication Standardization Sector (ITU-T), Ethernet ring protection (ERP) switching is described with the aim of fast protection switching for ring topologies having physical loops while ostensibly avoiding logical loops at the Ethernet layer. Logical loops adversely affect network performance and operation and are undesirable for Ethernet networks. Specifically, G.8032 avoids logical loops in an Ethernet ring network by reserving so-called Ring Protection Links (RPL), which are linked to an RPL Owner Node and an RPL Neighbor Node at each end of the ring. When the Ethernet ring network is operating normally, RPLs block network traffic to avoid logical loops from forming. When an associated physical link in the Ethernet ring network fails, the RPL is activated to transmit (i.e., unblock) network traffic by the RPL Owner Node or the RPL Neighbor Node.

Additionally, ring nodes maintain a local buffer, known as a filtering database (FDB) that stores topology information about neighboring nodes in G.8032. When a topology change in the G.8032 network occurs, such as for a protection switch event, the topology information, typically stored in the form of media access control (MAC) addresses, is flushed. After flushing of the local buffers, each ring will begin to broadcast data frames until the MAC addresses are learned again for the new topology.

However, despite the G.8032 protocol, Ethernet ring networks may excessively flush local buffers upon a topology change, which is undesirable because of the excess network traffic generated as a result.

SUMMARY

In one aspect, a disclosed method for buffer flush optimization in Ethernet networks may include receiving, at a first ring node in an Ethernet ring protection (ERP) network, a topology change notification (TCN) message indicating a topology change in a sub-ring of the ERP network. Responsive to receiving the TCN message, the method may include sending an improved ring automatic protection switching (R-APS) event message to other nodes in the ERP network, where the improved R-APS event message includes a sub-ring identifier (SUB_RING_ID) indicative of an identity of the sub-ring and a TCN sequence number (TCN#) indicative of the TCN message.

In any of the disclosed embodiments of the method, sending the improved R-APS event message may further include sending three improved R-APS event messages with a do not flush (DNF) attribute bit set to 0, and thereafter, sending conventional R-APS messages with the DNF attribute bit set to 1.

In any of the disclosed embodiments, the method may further include receiving a plurality of improved R-APS event messages from other nodes in the ERP network. Based on a value pair of SUB_RING_ID and TCN# in the received improved R-APS event messages, after a first improved R-APS event message having the value pair is received, the method may include identifying subsequently received improved R-APS event messages having the value pair as redundant improved R-APS event messages. The method may further include suspending local flushing of a filtering database (FDB) in response to receiving the redundant improved R-APS event messages.

In any of the disclosed embodiments of the method, the ERP network may comply with the G.8032 recommendation promulgated by the ITU-T.

In any of the disclosed embodiments of the method, the first ring node may be selected from a major ring node and a sub-ring node.

Additional disclosed aspects for buffer flush optimization in Ethernet networks include an ERP network comprising various ring nodes, a system or a network element comprising a processor configured to access non-transitory computer readable memory media, and an article of manufacture comprising non-transitory computer readable memory media storing processor-executable instructions.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
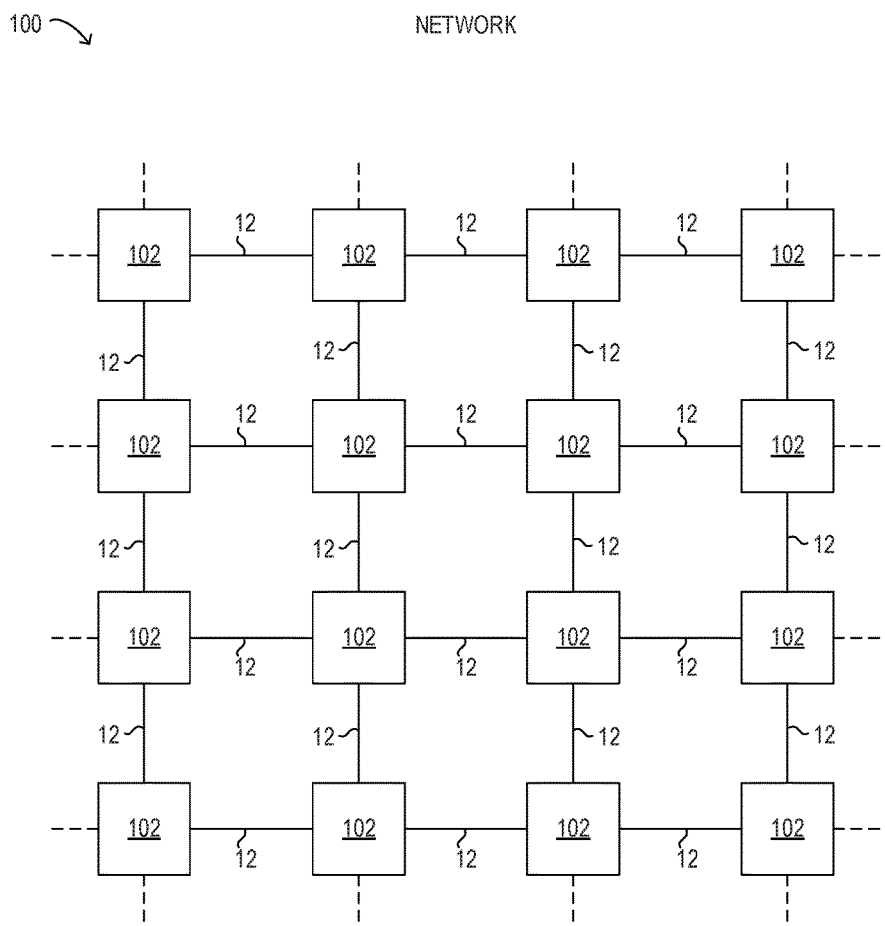
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Turning now to the drawings, FIG. 1 is a block diagram showing selected elements of an embodiment of network 100. In various embodiments, network 100 may be an Ethernet network. Network 100 includes one or more transmission media 12 operable to transport one or more signals communicated by components of network 100. The components of network 100, coupled together by transmission media 12, include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a Ti cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

During operation or design of network 100, or a particular topology associated with network 100, a change in topology of network 100 may occur, as will be described in further detail. The change in topology may result from a failure of a link or a node in network 100, such as a result of a protection switching event, or due to a failure recovery.

When network 100 includes an Ethernet ring protection (ERP) network, such as specified by G.8032, each node maintains a local buffer, the filtering database (FDB), with topology information about nodes and paths to those nodes. When a topology change occurs in the ERP network, the nodes in the ring may delete the topology information describing the previous topology, such as in the form of MAC addresses for other nodes and the paths to those nodes. Then, the nodes in the ring of the ERP network may begin to broadcast messages until the new topology has been learned. As a result of this behavior, as well as specific particularities with G.8032 described in further detail below, the ERP network may become flooded with duplicate frames, resulting in a large amount of transient network traffic that can dwarf the normal, steady-state traffic load. In some instances, the resulting transient network traffic may exceed the link capacity at certain nodes in the ERP network, resulting in frames being dropped. Additionally, many duplicate buffer flushes may be performed as a result, which is undesirable.

As described in further detail herein, a buffer flush optimization in ERP networks is disclosed.

Figure 2:
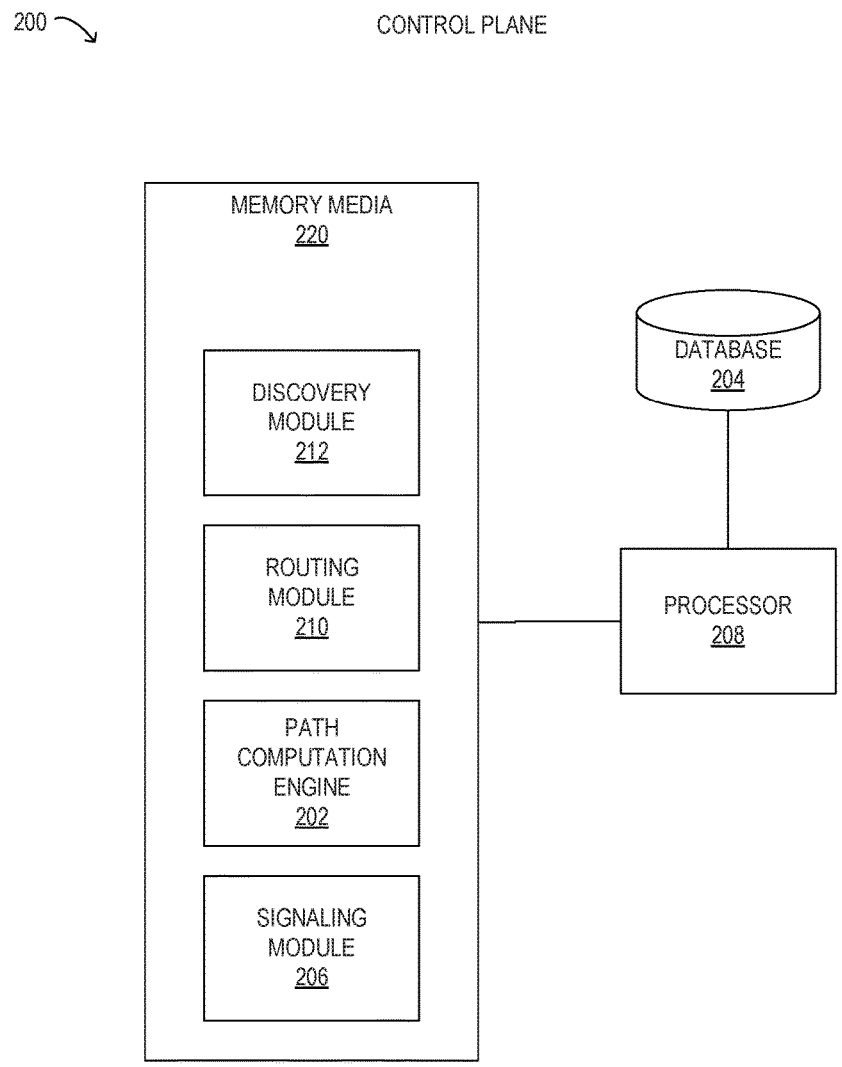
FIG. 2 is a block diagram of selected elements of an embodiment of a control plane.

Turning now to FIG. 2 a block diagram of selected elements of an embodiment of control plane 200 for implementing control plane functionality in networks, such as, for example, in network 100 (see FIG. 1), is illustrated. A control plane includes functionality for network intelligence and control and comprises applications that support the ability to establish network services, including applications or modules for discovery, routing, path computation, and signaling, as will be described in further detail. The control plane applications executed by control plane 200 work together to automatically establish services within network 100, which may be at least in part an optical network. Discovery module 212 discovers local links connecting to neighbors. Routing module 210 broadcasts local link information to network nodes while populating database 204. When a request for service from network 100 is received, path computation engine 202 may be called to compute a network path using database 204. This network path may then be provided to signaling module 206 to establish the requested service.

As shown in FIG. 2, control plane 200 includes processor 208 and memory media 220, which store executable instructions (i.e., executable code) executable by processor 208, which has access to memory media 220. Processor 208 may execute instructions that cause control plane 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. In some embodiments, path computation engine 202, in conjunction with signaling module 206, discovery module 212, and/or routing module 210, may represent instructions and/or code for implementing various algorithms according to the present disclosure.

In certain embodiments, control plane 200 may be configured to interface with a person (i.e., a user) and receive data about the signal transmission path. For example, control plane 200 may also include and/or may be coupled to one or more input devices and/or output devices to facilitate receiving data about the signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control plane 200 may be configured to receive data about the signal transmission path from a device such as another computing device and/or a network element (not shown in FIG. 2).

As shown in FIG. 2, in some embodiments, discovery module 212 may be configured to receive data concerning a signal transmission path in a network and may be responsible for discovery of neighbors and links between neighbors. In other words, discovery module 212 may send discovery messages according to a discovery protocol, and may receive data about the signal transmission path. In some embodiments, discovery module 212 may determine features, such as, but not limited to, media type; media length; number and/or type of components; data rate; modulation format of the data; input power of an optical signal; number of optical signal carrying wavelengths (i.e., channels); channel spacing; traffic demand; and/or network topology, among others.

As shown in FIG. 2, routing module 210 may be responsible for propagating link connectivity information to various nodes within a network, such as network 100. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may be configured to use the information provided by routing module 210 to database 204 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 202 may consider the interplay between various transmission degradation factors. In various embodiments, path computation engine 202 may generate values for specific transmission degradation factors. Path computation engine 202 may further store data describing the signal transmission path in database 204.

In FIG. 2, signaling module 206 may provide functionality associated with setting up, modifying, and tearing down end-to-end networks services in network 100. For example, when an ingress node in the optical network receives a service request, control plane 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path. For example, signaling module 206 may be enabled to provision ERP nodes in an ERP network, including installing or configuring ERP processes on each node in the ERP network.

According to G.8032, a non-degenerate Ethernet ring that provides link protection includes at least three ERP nodes, such that an ERP node is linked to at least two neighboring ERP nodes respectively with at least two independent ring links, which provides for link protection (i.e., redundancy) when an operating link fails. The ring links are configured using RPLs to prohibit formation of logical loops that are undesirable in an ERP network due to uncontrollable traffic forwarding that may occur over the logical loops. The rings may be major rings that are configured as a physical loop with at least three nodes and at least three independent ring links. As noted previously, an ERP network conforming with G.8032 will have at least one major ring. The rings may also include so-called 'sub-rings' having at least three nodes and at least two independent ring links.

The ring topology may be used to interconnect different ERP networks. For example, two ERP networks consisting of major rings might be interconnected using a single common node. However, such a topology is undesirable because the common node is a single point of failure for both the connected ERP networks, which increases risks of failure and also amplifies the impact of a failure of the common node. Under G.8032, a sub-ring is be connected to a major ring or another sub-ring using two common nodes, thereby enabling link protection at the two common nodes.

The RPLs are redundant links that form a physical loop but are blocked according to G.8032 to prevent a logical loop from forming. Under G.8032, the RPL may be in one of two states: idle and protecting. The idle state represents normal operation when the RPL is logically blocked and does not forward traffic, even though the physical link at the RPL is present. The idle state may indicate that no link or node faults are currently detected and that the network is operating normally. The protecting state represents a network condition to recover from a link error where the RPL is activated and forwards traffic. Thus, when an RPL is active, it may be assumed that another link in the network has failed, representing a topology change in the ERP network.

In operation, control plane 200 may be used to detect or determine nodes, links, and rings within an ERP network. The ERP network may be an existing network, such that control plane 200 communicates with network elements. In other instances, control plane 200 may process network information for a proposed network or a network design that represents a virtual network. After determination of respective numbers of the nodes, links, and rings within the ERP network, control plane 200 may be used to implement buffer flush optimization in the ERP network.

Figure 3A:
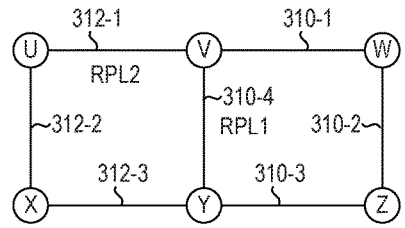
FIG. 3A is a network diagram of selected elements of a physical topology for a G.8032 ring network.

Referring now to FIG. 3A, a network diagram of selected elements of physical topology 300 for a G.8032 ring network is illustrated. As shown, physical topology 300 may represent an embodiment of network 100. In FIG. 3A, physical topology 300 includes nodes U, V, W, X, Y, Z and physical links 312, 310 in an Ethernet network. In some embodiments, an internal network-network interface (I-NNI, not shown) may be used as a secondary channel to send control messages between nodes and rings.

In physical topology 300, nodes V, W, Z, Y are a major ring that includes links 310-1, 310-2, 310-3, and 310-4. Nodes V, U, X, Y are a sub-ring connected to the major ring at nodes V and Y that includes links 312-1, 312-2, and 312-3. As will be described below with respect to FIGS. 3B, and 3C, link 310-4 may be configured as an RPL (RPL1) for the major ring, while link 312-1 may be configured as an RPL (RPL2) for the sub-ring. Because logical loops would result, physical topology 300 is not usable as a logical topology for an Ethernet network.

Figure 3B:
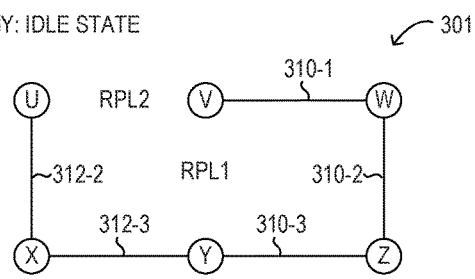
FIG. 3B is a network diagram of selected elements of a logical topology for a G.8032 ring network in an idle state.

Referring now to FIG. 3B, a network diagram of selected elements of logical topology 301 is illustrated. As shown, logical topology 301 may represent an idle state of physical topology 300 (see FIG. 3A). Specifically, logical topology 301 shows links for RPL1 and RPL2 each in an idle state and blocked for network traffic, leaving nodes U-X-Y-Z-W-V connected in a linear topology (i.e., a spanning tree that does not include logical loops) that is suitable for Ethernet network operation.

Figure 3C:
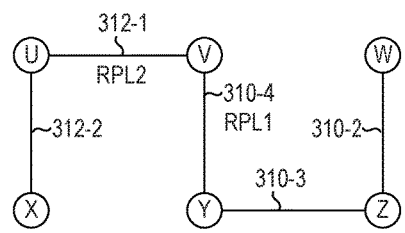
FIG. 3C is a network diagram of selected elements of a logical topology for a G.8032 ring network in a protection state.

Referring now to FIG. 3C, a network diagram of selected elements of logical topology 302 is illustrated. As shown, logical topology 302 may represent a protection state of physical topology 300 (see FIG. 3A), where links 310-1 and 312-3 have failed. Logical topology 302 shows links for RPL1 and RPL2 each in a protection state and transmitting network traffic, leaving nodes X-U-V-Y-Z-W connected in a linear topology (i.e., a spanning tree that does not include logical loops) that is suitable for Ethernet network operation. Although a dual failure for the major ring and the sub-ring are illustrated in FIG. 3B for descriptive clarity, it will be understood that RPL1 or RPL2 may individually respond to a failure and operate independently of one another in the protecting state.

Figures 4, 5:
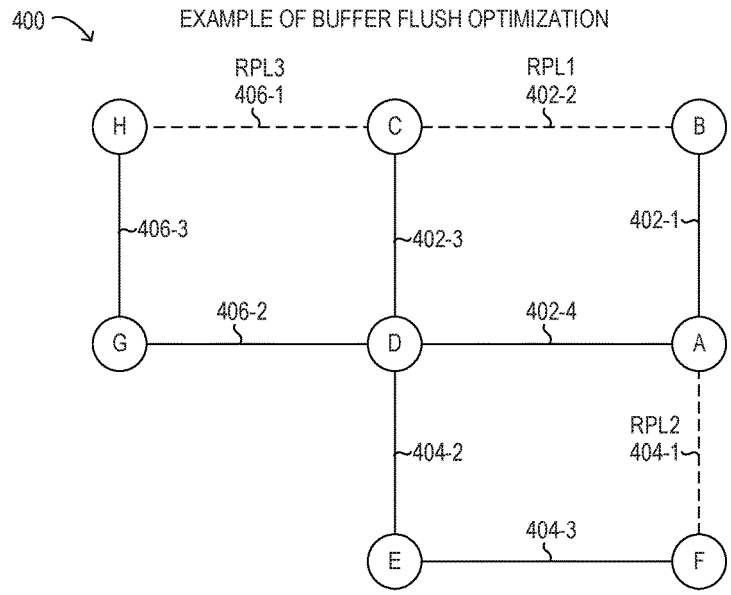
FIG. 4 is a network diagram of selected elements of an example of buffer flush optimization.
FIG. 5 is a block diagram of selected elements of an embodiment of a protocol data unit (PDU)

Referring now to FIG. 4, a network diagram of selected elements of an example 400 of buffer flush optimization in ERP networks is depicted. As shown, example 400 may represent an embodiment of network 100. In example 400, eight (8) nodes (A, B, C, D, E, F, G, H) represent network nodes. Also, ten (10) physical links (402, 404, 406) are present between the 8 nodes. In example 400, the physical links have been configured in an exemplary logical topology as G.8032 rings, whose basic logical operation is described above with respect to FIGS. 3A, 3B, and 3C. The configuration of the physical links is described below for the exemplary logical topology shown in FIG. 4. It will be understood that other logical topologies may be implemented in different embodiments.

A major ring logically configured to connect nodes C-D-A-B is indicated by links 402. A first sub-ring logically configured to connect nodes D-E-F is indicated by links 404. A second sub-ring logically configured to connect nodes D-G-H is indicated by links 406. In the major ring, link 402-2 between nodes C-B has been logically configured as RPL1 (shown as a dotted line). In the first sub-ring, link 404-1 between nodes A-F has been logically configured as RPL2 (shown as a dotted line). In the second sub-ring, link 406-1 between nodes H-C has been logically configured as RPL3 (shown as a dotted line). Nodes A and D are interconnection nodes between the major ring and the first sub-ring, while nodes C and D are interconnection nodes between the major ring and the second sub-ring. Thus, nodes A, C, D are interconnection nodes that host more than one ring instance, with node D hosting all three (3) ring instances.

It is noted that each instance of a ring configured at an ERP network node results in a separate ERP process that executes on the ERP network node. Thus, for example, node A may locally execute two ERP processes: a first ERP process for the major ring and a second ERP process for sub-ring1; node D may locally execute three ERP processes: a first ERP process for the major ring, a second ERP process for sub-ring1, and a third ERP process for sub-ring2; and node C may locally execute two ERP processes: a first ERP process for the major ring, and a second ERP process for sub-ring2. The ERP processes may represent ring entities, where each ring entity maintains an FDB on a given node. The ERP control messages may thus be sent to a given ERP process representing a ring entity on a given node. Furthermore, multiple individual ERP processes on a given node may communicate with each other as separate ring entities. Thus, certain ERP control messages from one ring to another ring may be transmitted locally from one ERP process to another ERP process executing on the same node. The ERP processes may represent ERP software that is installed and configured on the node when the ERP network is provisioned.

According to G.8032, any topology change in a sub-ring is notified to an adjacent ring via an interconnection node by sending a topology change notification (TCN) message, which is an example of a first ERP control message. The TCN message may be a spanning tree protocol topology change notification (STP TCN) or a rapid spanning tree protocol topology change notification (RSTP TCN), among others, depending on the particular topology implemented. In many cases, such as shown in FIG. 4, the adjacent ring is a major ring, but in some cases, the adjacent ring node receiving the TCN message may be another sub-ring, such as in a ladder configuration.

Furthermore, in a G.8032 ERP network, ring automatic protection switching (R-APS) messages, an example of a second ERP control message, may be sent by certain nodes when the topology change occurs, such as in response to receiving the TCN message. In the examples described herein, an R-APS event message is sent. As a result, the FDBs may relearn MAC addresses from the flooding of frames having unknown destination addresses that occurs throughout the ERP network.

For example, in a conventional ERP network, a topology change in the first sub-ring, such as a failure of links 404-2 or 404-3, may be notified with a TCN message to the major ring on interconnection nodes A and D. In response to the TCN message received, nodes A and D will perform a local FDB flush and then nodes A and D will transmit three (3) conventional R-APS event messages. Thereafter or concurrently, each node may continue send one conventional R-APS message every 5 seconds, as a normal ongoing operation. For example, node D may transmit three conventional R-APS event messages over link 402-3 to node C, another three conventional R-APS event messages over link 402-4 to node A. The conventional R-APS event messages sent by node D may also be received by node B. Meanwhile, node A may transmit three conventional R-APS event messages over link 402-1 to node B, and three conventional R-APS event messages over link 402-4 to node D. The conventional R-APS event messages sent by node A may also be received by node C. Each of these conventional R-APS event messages results in three (3) local FDB flush operations. In this example, as a result of a single topology change, nodes A and D have now locally flushed FDB four (4) times, while nodes B and C have locally flushed FDB six (6) times, which is undesirable because of the redundancy in the flush operations.

The redundant flush operations may be mitigated to a degree by disabling the TCN message response on one of nodes A or D, but the redundancy is still not eliminated. The inventors of the present disclosure have discovered that the redundancy arises because the conventional R-APS event messages are identical and do not specify the source of the TCN message (in the above example, sub-ring1). Therefore, the recipient of the conventional R-APS event message responds exactly in the same manner to each conventional R-APS event message received.

Furthermore, the redundant flush operations also result from an attribute in the R-APS message protocol data unit (PDU), specifically, a do not flush (DNF) attribute (see also FIG. 5). When the DNF bit in an R-APS message is set to zero (0), the recipient of the R-APS event message is indicated to flush the recipient's local FDB. As described in the above example, each conventional R-APS message, including any conventional R-APS event messages, is sent with DNF=0, which causes the multiple FDB flush operations at individual nodes, which is undesirable.

In order to address the above-described issues with excessive buffer flush in ERP networks using conventional R-APS event messages, the inventors of the present disclosure have implemented buffer flush optimization in ERP networks using an improved R-APS event message that enables a recipient of the improved R-APS event message to differentiate between the improved R-APS event message received from different sub-rings. Specifically, two additional attributes have been added to the improved R-APS event message specification to generate the improved R-APS event message (see also FIG. 5). A first new attribute in the improved R-APS event message is referred to as a sub-ring identifier (SUB_RING_ID) representing a ring identifier of a sub-ring where the topology change occurs. A second new attribute in the improved R-APS event message is referred to as a TCN sequence number (TCN#). Based on values of SUB_RING_ID and TCN# in the improved R-APS event message, the recipient of the improved R-APS event message is able to detect a duplicate R-APS event message for the same sub-ring.

In addition to defining SUB_RING_ID and TCN# in the improved R-APS event message, the respective ERP process at each node is also modified for buffer flush optimization in ERP networks, as disclosed herein. Specifically, the ERP process executing at each node for each respective ring associated with the node is improved to be enabled to check for SUB_RING_ID and TCN# in the improved R-APS event message received. When the values for both SUB_RING_ID and TCN# in two improved R-APS event messages received by the ERP process are identical, the ERP process may determine that the two improved R-APS event messages are redundant, and may ignore one of the two improved R-APS event messages. As a result of ignoring duplicate or redundant R-APS event messages, FDB flush operations at the respective nodes are avoided.

Furthermore, excessive flushing of the FDB may further be reduced by resetting the DNF bit in the improved R-APS event message. Specifically, the ERP process may be modified such that when the improved ERP process receives a TCN message, the improved ERP process transmits three (3) improved R-APS event messages with DNF=0. Thereafter or concurrently, the improved ERP process may transmit conventional R-APS message with DNF=1, such as the ongoing periodic transmission of R-APS no request messages every 5 seconds.

The buffer flush optimization in ERP networks disclosed herein may prevent network flooding due to transient network traffic resulting from excessive buffer flushing of FDBs upon topology changes. The buffer flush optimization in ERP networks disclosed herein may optimize the number of buffer flush messages sent in response to a topology change. The buffer flush optimization in ERP networks disclosed herein may optimize the number of buffer flush operations performed in response to a topology change. The buffer flush optimization in ERP networks disclosed herein may reduce the number of buffer flush operations due to DNF bit settings. The buffer flush optimization in ERP networks disclosed herein may provide a generic solution that is independent of a type of topology change. The buffer flush optimization in ERP networks disclosed herein may optimize the number of buffer flush operations for a topology change in a major ring as well as a sub-ring of an ERP network. The buffer flush optimization in ERP networks disclosed herein may be relatively easy to implement and to verify. The buffer flush optimization in ERP networks disclosed herein may be a reliable and consistent solution that can be incorporated into any distributed network system. The buffer flush optimization in ERP networks disclosed herein may be interoperable with third-party network nodes executing conventional ERP processes and using conventional ERP control messages.

Referring now to FIG. 5, a block diagram of selected elements of an embodiment of a PDU 500 for an improved R-APS event message is shown. In PDU 500, the first two top rows and the left column are shown as indices corresponding to a PDU width of 4 bytes (32 bits) having a variable number of rows indexed by the left column. In PDU 500, for example, SUB_RING_ID and TCN# have been defined starting with row 13. It is noted that other arrangements of SUB_RING_ID and TCN# may be implemented in the improved R-APS event message disclosed herein.

Also shown in FIG. 5 is the Request/State field at byte 5 (shown as row 2), which may be a 4-bit value field that has the following possible entries: forced switch, event, signal fail, manual switch, and no request. As used herein, "R-APS event messages" have the Request/State field value corresponding to 'event' to designate event messages. As used herein, "R-APS messages" have any value for the Request/State field value.

Figure 6:
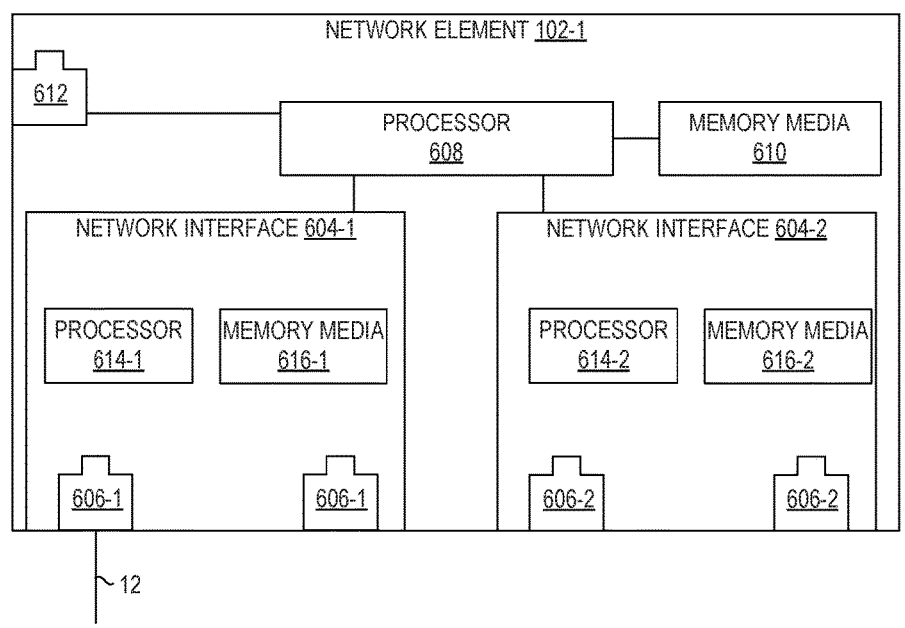
FIG. 6 is a block diagram of selected elements of an embodiment of a network element.

Referring now to FIG. 6, a block diagram is illustrated of selected elements of an embodiment of network element 102-1. Network element 102-1 is represented as a particular embodiment of network elements 102 in FIG. 1 for descriptive purposes. At least certain portions of network element 102-1 may represent an ERP node in an ERP network for buffer flush optimization. Network element 102-1, as shown, includes processor 608 and memory media 610, and external port 612, along with network interface 604-1 having ports 606-1 and network interface 604-2 having ports 606-2. External port 612 may be used by processor 608 to communicate with neighbor network elements (see FIG. 1).

As depicted in FIG. 6, network element 102-1 may include processor 608 and memory media 610 that may store instructions executable by processor 608. As shown, memory media 610 may represent volatile, non-volatile, fixed, and/or removable media, and may be implemented using magnetic and/or semiconductor memory. Memory media 610 is capable of storing instructions (i.e., code executable by processor 608) or data. Memory media 610 or at least a portion of contents of memory media 610 may be implemented as an article of manufacture comprising non-transitory computer readable memory media storing processor-executable instructions. Memory media 610 may store instructions including an operating system (OS), which may be any of a variety of operating systems, such as a UNIX variant, LINUX, a Microsoft Windows® operating system, or a different operating system.

In FIG. 6, network elements 102 are shown including at least one network interface 604, which provides a plurality of ports 606 that receive a corresponding transmission media 12 (see also FIG. 1). Ports 606 and transmission media 12 may represent galvanic or optical network connections or combinations thereof. Each network interface 604 may include any suitable system, apparatus, or device configured to serve as an interface between a network element 102 and transmission medium 12. Each network interface 604 may enable its associated network element 102 to communicate with other network elements 102 using any of a variety of transmission protocols or standards. Network interface 604 and its various components may be implemented using hardware, software, or any combination thereof. In certain embodiments, network interfaces 604 may include a network interface card. In various embodiments, network interfaces 604 may include a line card. Each port 606 may include a system, device or apparatus configured to serve as a physical interface between corresponding transmission medium 12 and network interface 604. In some embodiments, port 606 may comprise an Ethernet port. Although in FIG. 2 network interfaces 604 are shown with 2 instances of ports 606 for descriptive clarity, in different embodiments, network interfaces 604 may be equipped with different numbers of ports 606 (e.g., 4, 6, 8, 16 ports, etc.).

In various embodiments, network element 102 may be configured to receive data and route such data to a particular network interface 604 or port 606 based on analyzing the contents of the data or based on a characteristic of a signal carrying the data (e.g., a wavelength or modulation of the signal). In certain embodiments, network element 102 may include a switching element that may include a switch fabric (SWF).

As shown in FIG. 6, network interfaces 604 may include respective processors 614 and memory media 616, which may store and execute instructions and may be implemented in a similar manner as described above with respect to processor 608 and memory media 610, respectively. In various embodiments, processors 614 may execute internal instructions and operations, such as for packet routing and forwarding, and may be under control or supervision of processor 608. In some embodiments where network element 102-1 is configured as an ERP node in an ERP network, memory media 610 may store instructions or code corresponding to an ERP process, as described above, that is executable by processor 608. In some embodiments where network interface 604 is configured as an ERP node in an ERP network, memory media 616 may store instructions or code corresponding to an ERP process, as described above, that is executable by processor 614. It is noted that other implementations of the ERP node may be used for buffer flush optimization in ERP networks.

Figure 7:
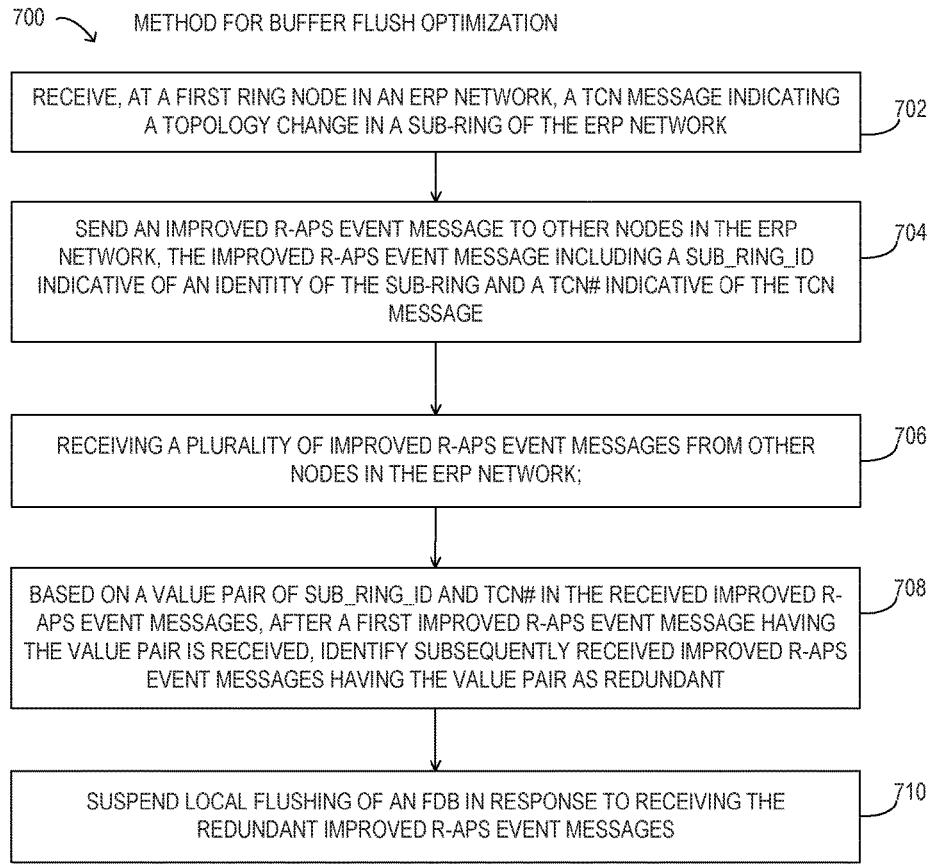
FIG. 7 is a flow chart of selected elements of a method for buffer flush optimization in ERP networks.

Referring now to FIG. 7, a block diagram of selected elements of an embodiment of method 700 for buffer flush optimization in ERP networks, as described herein, is depicted in flowchart form. At least certain portions of method 700 may be performed by an ERP process, as disclosed above. In some embodiments, certain portions of method 700 may be executed by control plane 200 (see FIG. 2). It is noted that certain operations described in method 700 may be optional or may be rearranged in different embodiments.

Method 700 begins at step 702 by receiving, at a first ring node in an ERP network, a TCN message indicating a topology change in a sub-ring of the ERP network. The first ring node may be a major ring node or a sub-ring node. Responsive to receiving the TCN message, at step 704, an improved R-APS event message is sent to other nodes in the ERP network, where the improved R-APS event message includes a SUB_RING_ID indicative of an identity of the sub-ring and a TCN# indicative of the TCN message. In step 704, sending the improved R-APS event message may further include sending three improved R-APS event messages with a DNF attribute bit set to 0, and thereafter, sending conventional R-APS messages with the DNF attribute bit set to 1. At step 706, a plurality of improved R-APS event messages is received from other nodes in the ERP network. Based on a value pair of SUB_RING_ID and TCN# in the received improved R-APS event messages, at step 708, after a first improved R-APS event message having the value pair is received, subsequently received improved R-APS event messages having the value pair are identified as redundant improved R-APS event messages. At step 710, local flushing of a filtering database (FDB) is suspended in response to receiving the redundant improved R-APS event messages.

As disclosed herein, a method and system for buffer flush optimization in ERP networks includes generating improved ERP control messages to include a sub-ring identifier and a topology change notification sequence number. When the improved ERP control messages are received, the recipient is enabled to disambiguate multiple redundant ERP control messages. Additionally, a do not flush attribute bit may be cleared for the improved ERP control messages.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for buffer flush optimization in Ethernet networks, the method comprising:
receiving, at a first ring node in an Ethernet ring protection (ERP) network, a topology change notification (TCN) message indicating a topology change in a sub-ring of the ERP network;
responsive to receiving the TCN message, sending an ring automatic protection switching (R-APS) event message to other nodes in the ERP network, wherein the R-APS event message includes a sub-ring identifier (SUB_RING_ID) indicative of an identity of the sub-ring and a TCN sequence number (TCN#) indicative of the TCN message;
receiving a plurality of R-APS event messages from other nodes in the ERP network;
based on a value pair of SUB_RING_ID and TCN# in the received R-APS event messages, after a first R-APS event message having the value pair is received, identifying subsequently received R-APS event messages having the value pair as redundant R-APS event messages; and
suspending local flushing of a filtering database (FDB) in response to receiving the redundant R-APS event messages.

2. The method of claim 1, wherein sending the R-APS event message further comprises:
sending three R-APS event messages with a do not flush (DNF) attribute bit set to 0; and
thereafter, sending conventional R-APS messages with the DNF attribute bit set to 1.

3. The method of claim 1, wherein the ERP network complies with the G.8032 recommendation promulgated by the International Telecommunication Union Telecommunication Standardization Sector (ITU-T).

4. The method of claim 1, wherein the first ring node is selected from a major ring node and a sub-ring node.

5. An Ethernet ring protection (ERP) network comprising:
a plurality of nodes forming at least one major ring and at least one sub-ring;
a plurality of physical links communicatively interconnecting the plurality of nodes; and
a first ring node for:
receiving a topology change notification (TCN) message indicating a topology change in a sub-ring of the ERP network;
responsive to receiving the TCN message, sending an ring automatic protection switching (R-APS) event message to other nodes in the ERP network, wherein the R-APS event message includes a sub-ring identifier (SUB_RING_ID) indicative of an identity of the sub-ring and a TCN sequence number (TCN#) indicative of the TCN message;
receiving a plurality of R-APS event messages from other nodes in the ERP network;
based on a value pair of SUB_RING_ID and TCN# in the received R-APS event messages, after a first R-APS event message having the value pair is received, identifying subsequently received R-APS event messages having the value pair as redundant R-APS event messages; and
suspending local flushing of a filtering database (FDB) in response to receiving the redundant R-APS event messages.

6. The ERP network of claim 5, wherein sending the R-APS event message further comprises:
sending three R-APS event messages with a do not flush (DNF) attribute bit set to 0; and
thereafter, sending conventional R-APS messages with the DNF attribute bit set to 1.

7. The ERP network of claim 5, wherein the ERP network complies with the G.8032 recommendation promulgated by the International Telecommunication Union Telecommunication Standardization Sector (ITU-T).

8. The ERP network of claim 5, wherein the first ring node is selected from a major ring node and a sub-ring node.

9. A network element for buffer flush optimization in Ethernet networks, the network element comprising:
a processor configured to access non-transitory computer readable memory media, wherein the non-transitory computer readable memory media store processor-executable instructions, the instructions, when executed by a processor, cause the processor to:
receive, at a first ring node in an Ethernet ring protection (ERP) network, a topology change notification (TCN) message indicating a topology change in a sub-ring of the ERP network; and
responsive to receiving the TCN message, send an ring automatic protection switching (R-APS) event message to other nodes in the ERP network, wherein the R-APS event message includes a sub-ring identifier (SUB_RING_ID) indicative of an identity of the sub-ring and a TCN sequence number (TCN#) indicative of the TCN message;
receive a plurality of R-APS event messages from other nodes in the ERP network;
based on a value pair of SUB_RING_ID and TCN# in the received R-APS event messages, after a first R-APS event message having the value pair is received, identify subsequently received R-APS event messages having the value pair as redundant R-APS event messages; and
suspend local flushing of a filtering database (FDB) in response to receiving the redundant R-APS event messages.

10. The network element of claim 9, wherein the instructions to send the R-APS event message further comprise instructions to:
send three R-APS event messages with a do not flush (DNF) attribute bit set to 0; and
thereafter, send conventional R-APS messages with the DNF attribute bit set to 1.

11. The network element of claim 9, wherein the ERP network complies with the G.8032 recommendation promulgated by the International Telecommunication Union Telecommunication Standardization Sector (ITU-T).

12. The network element of claim 9, wherein the first ring node is selected from a major ring node and a sub-ring node.

* * * * *